United States Patent [19]

Haruta et al.

[11] 4,361,842
[45] Nov. 30, 1982

[54] RECORDING METHOD USING FILM FORMING LIQUID COMPOSITION

[75] Inventors: Masahiro Haruta, Funabashi; Yohji Matsufuji, Tokyo; Yasuhiro Yano, Tokyo; Tokuya Ohta, Yokohama; Tsuyoshi Eida, Chiba, all of Japan

[73] Assignee: Canon Kabushiki Kaisha, Tokyo, Japan

[21] Appl. No.: 184,750

[22] Filed: Sep. 8, 1980

[30] Foreign Application Priority Data

Sep. 14, 1979 [JP] Japan .................................. 54-118242
Nov. 14, 1979 [JP] Japan .................................. 54-147525
Nov. 16, 1979 [JP] Japan .................................. 54-148664

[51] Int. Cl.$^3$ ........................ B05D 1/02; G01D 15/18
[52] U.S. Cl. .................................... 346/1.1; 106/22; 346/140 R
[58] Field of Search ...................... 346/1.1, 75, 140 R; 106/22, 23

[56] References Cited

U.S. PATENT DOCUMENTS

| | | | |
|---|---|---|---|
| 4,233,610 | 11/1980 | Fischbeck et al. | 346/140 PD |
| 4,243,994 | 1/1981 | Kobayashi et al. | 430/117 X |
| 4,251,824 | 2/1981 | Hara et al. | 346/1.1 X |

FOREIGN PATENT DOCUMENTS

2843064 4/1979 Fed. Rep. of Germany .

Primary Examiner—Evan K. Lawrence
Attorney, Agent, or Firm—Fitzppatrick, Cella, Harper & Scinto

[57] ABSTRACT

A recording method and a liquid composition for recording on a recording medium with a recording agent discharged from the discharge orifice of a recording head in the form of flying droplets by the repeated heating of a heating zone in the recording head, includes the steps of filling the heating zone with a liquid containing a liquid medium, a coating-film forming compound which undergoes thermal oxidation when subjected to heat energy for forming a coating film, and a recording agent, and causing heat energy to repeatedly act on the liquid to cause the repeated formation of coating film on the wall surface of the heating zone.

4 Claims, 2 Drawing Figures

RECORDING METHOD USING FILM FORMING LIQUID COMPOSITION

BACKGROUND OF THE INVENTION

1. Field of the Invention

This invention relates to a recording method using a liquid composition which is capable of repetitively forming a coating film during flow of the liquid through a liquid flow passageway.

2. Description of Prior Art

Non-impact recording methods have recently drawn the attention of all concerned in view of their advantages; e.g., the noise which develops at the time of recording is so low as to be negligible. Of various types of the non-impact recording methods, the so-called "ink-jet recording method (the recording method by ejection of liquid through a nozzle)" is highly useful, according to which the recording operation can be effected on the so-called "plain paper" without subjecting it to a special treatment of image-fixing. Heretofore, various proposals for improving the ink jet recording system have been made and various ink jet recording devices have been embodied on the basis of such concepts, some of which have already been commercialized with improvements being incorporated, and others of which are still under way for their practical use.

As one example, the liquid jet recording method as disclosed in a laid-open German Patent Application (DOLS) No. 2843064 has a characteristic different from other liquid jet recording methods in that heat energy, i.e., the liquid droplet forming energy, acts on the liquid to be ejected to obtain the driving power for the discharge of the droplets.

According to this disclosed recording method, the liquid which has been subjected to the action of the heat energy undergoes a change in state together with a rapid increase in volume, and, by the force of action derived from the state change, the liquid droplets are discharged from an orifice (or orifices) at the tip end of the recording head, fly to a recording member, and adhere onto it to complete the recording.

The liquid jet recording method disclosed in the abovementioned DOLS No. 2843064 has such a characteristic that it is not only effectively applicable to the so-called "drop-on demand" recording method, but also enables the recording head to be readily made in a full line type, high density multi-orifice construction; hence, an image having high image resolution and image quality can be obtained at a high speed.

Thus, while the abovementioned liquid jet recording method possesses excellent characteristics, it is still necessary to improve its life in the repetitive operations of the recording head (i.e. service life) in those cases where the device is to be operated at a higher speed and for a longer operating period for recording images of high resolution and image quality.

The main factor which governs the service life of the recording head employed in the recording method as described above resides in the life of an electro-thermal transducer to be provided in the recording device as the heat energy generating element. That is, the recording head to be used in the above-described recording method has a construction as illustrated in FIG. 1 of the accompanying drawing, according to which the electro-thermal transducer 102 is generally constructed in such a manner that it may contact a liquid to be introduced thereinto, at a heat acting zone 107 where heat energy acts on the liquid, from a direction of an arrow A through a heat acting surface 109 as the energy acting zone. This construction enables the heat energy generated as the droplet forming energy to effectively and efficiently act on the heat acting zone 107.

For this purpose, in the case of using an ordinary recording liquid such as water as a liquid medium, it becomes necessary that electric leakage between the electrodes 113 and 114 through the recording liquid be prevented, and the upper layer 112 is formed at least on the heat generating resistive layer 111 at the heat generating zone 108 when manufacturing the head so as to protect the heat generating resistive layer 111 from the recording liquid, or thermal oxidation.

The principle of forming the flying droplets in the recording method using such recording head is as follows. When the electro-thermal transducer is subject to electric conduction as mentioned above, the recording liquid at the heat acting zone 107, which has received the action of the heat energy to form the droplets, undergoes a change of state accompanied by an abrupt increase in its volume, i.e., the recording liquid in the heat acting zone 107 is vaporized in an instant (on the order of a micro-second) to cause instantaneous bubbling and volume expansion at this heat acting zone 107. Then, when the electric conduction is disconnected, the liquid volume contracts instantaneously and the generated bubbles extinguish accordingly. The speed of this liquid volume contraction and bubble extinction is so high that it is substantially equal to, or slightly slower than, the speed in the abovementioned bubble generation and expansion.

As the result of an enormous amount of repeated experiments and careful studies by the present inventors, it has been discovered that, in the repetition of generation, expansion, contraction and extinction of the bubbles, the contraction and extinction of the bubbles which take place at the latter half of the repetitive process constitute, in particular, the main factor which governs the service life of the electro-thermal transducer.

That is to say, since the abovementioned process of the bubble contraction and extinction occurs at a very high speed, shock waves from these contractions and extinctions directly strike the heat acting surface 109. As a result, the heat acting surface 109 is subjected to impact by the shock waves every time the droplet discharging is repeated, and eventually it is damaged by the shock waves. In particular, the higher the frequency of a pulse signal to be applied for driving the electro-thermal transducer 108 (driving frequency) becomes (i.e., the more often the droplet forming operation is done to effect the high speed recording), or, the higher the level value of the pulse signal to be applied is made, the larger is the impact on the heat acting surface due to the shock waves. This constitutes the fundamental factor to curtail the service life of the electro-thermal transducer 102.

In addition, since a temperature difference on the heat acting surface 109 at the time of conduction and non-conduction of electricity thereto is remarkably large and such temperature difference occurs in a very brief period of time, a stress is imposed on the heat generating zone 108 due to such thermal factor, which is liable to cause a strain in the upper layer 112 whereby cracks tend to readily take place. This also constitutes one of the factors which governs the service life of the electro-thermal transducer due to its repetitive use.

As mentioned in the foregoing, in spite of the fact that the abovementioned recording method has the advantage of being able to mass-produce the device, particularly, the recording head of a high density multiorifice construction at a low manufacturing cost, using the most advanced IC (integrated circuit) fabrication technology of the present-day, it has an inherent problem still to be solved in its fundamental point of the droplet formation which constitutes the factor to largely govern the service life of the recording head.

SUMMARY OF THE INVENTION

The present invention has been made in view of the abovementioned disadvantages in the conventional liquid jet recording method, and aims at remarkably prolonging the service life of the recording head to be used in the recording method as disclosed in the above referred-to German Patent Application DOLS No. 2843064, while remarkably increasing the reliability of the recording operation, and further reducing the rate of trouble occurrences to a much lower degree that the conventional recording method.

It is another object of the present invention to provide a liquid composition to attain the abovementioned object, when it is used with the recording method, in which the above-mentioned recording head is utilized.

According to the present invention, there is provided a recording method which causes liquid droplets to adhere onto the surface of a recording medium by the use of a recording head provided with a discharge orifice to eject liquid therefrom and to form flying droplets, a heat energy acting zone which is communicatively connected with the discharge orifice and a liquid feeding port and where heat energy to form the above-mentioned flying droplets is imparted repeatedly to the body of the liquid filled in the zone, and a heat energy generating element to generate the above-mentioned heat energy, the recording method comprising the steps of filling the heat energy acting zone with a liquid containing a liquid medium and a coating-film forming compound which undergoes a thermal oxidation reaction when subjected to the action of the heat energy and which is capable of and is used in an amount sufficient to form a re-formable coating film, and a recording agent to form an image on a recording medium; and causing the heat energy to repeatedly act on the liquid to subject the coating-film forming compound to the thermal oxidation reaction so as to repeatedly form the coating film on the wall surface of the heat energy acting zone.

DETAILED DESCRIPTION OF THE PREFERRED EMBODIMENTS

Figure 1A:
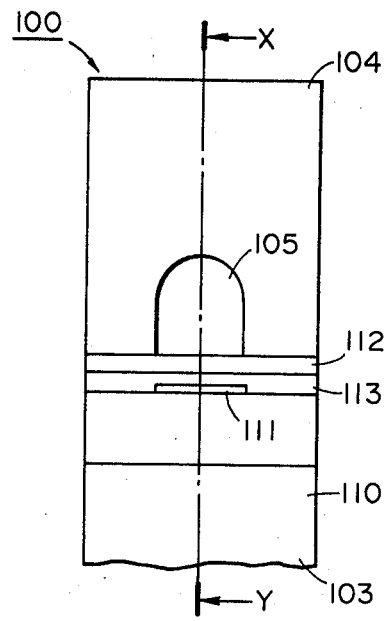
FIG. 1A is a partial front view of the liquid jet recording head according to the present invention, as viewed from the orifice side.

The coating-film forming compound contained in the liquid composition according to the present invention is one that is dissolved or dispersed in a liquid medium, and has a function of forming a re-formable coating film on the wall surface of a liquid flow path when it is subjected to a thermal oxidation reaction by the application of energy for such oxidation.

The coating-film forming compound may be a compound which has the above-mentioned function to a satisfactory extent, and which does not adversely affect the other component elements, the recording head with which it is used, and various recording characteristics. Effective coating-film forming compounds for the purposes of the present invention are, for example, certain kinds of organo-metallic chelate compounds, certain kinds of metal salts of organic acids, certain kinds of carbon functional silanes, certain kinds of metallized dyes, and so forth.

The organo-metal chelate compounds useful in the present invention may include, for example, those of monoazochromotropic acid derivatives, bisazochromotropic acid derivatives, dioxime derivatives, phthalein derivatives, sulfophthalein derivatives, fluorescein derivatives, azonaphthol derivatives, prophyrin derivatives and metalocene, which are classified according to the structures of the chelating reagents as the ligands.

Examples of those chelate compounds are:

1. Metal chelate compounds of monoazochromotropic acid derivatives:
(1) Be, Mn, Pd or Zr chelate of 2-(3,6-disulfo-8-hydroxynaphthylazo)-1,8-dihydroxy-naphthalene-3,6-disulfonic acid, $Na_4$ salt
(2) Al, Cu, Zn or Th chelate of 2-(4,5-dihydroxy-2,7-disulfo-3-naphthylazo)-phenylarsonic acid, $Na_2$ salt
(3) Co or Ni chelate of 2-(2-pyridylazo) chromotropic acid, $Na_2$ salt
(4) Co, Th or Zn chelate of 4,5-dihydroxy-3-[(4-sulfonaphthyl)azo]-2,7-naphthalenedisulfonic acid, $Na_3$ salt
(5) Th or Zr chelate of 3-(4-sulfophenylazo)-4,5-dihydroxy-2,7-naphthalenedisulfonic acid, $Na_3$ salt 2. Metal chelate compounds of bisazochromotropic acid derivatives
(1) Bi, Ca or Th chelate of 2,7-bis(2-arsonophenylazo)-1,8-dihydroxynaphthalene-3,6-disulfonic acid
(2) Ba, Sr, Ti, Zr or Pu chelate of 2,7-bis(4-chloro-2-phosphonophenylazo)-chromotropic acid, $Na_2$ salt
(3) Co, Pb or Zn chelate of 3,6-bis(4-sulfonaphthylazo)-4,5-dihydroxynaphthalene-2,7-disulfonic acid, $Na_4$ salt
(4) Mo, Nb or Zr chelate of 2,7-bis(2-hydroxy-3-sulfo-5-chlorophenylazo)-1,8-dihydroxynaphthalene-3,6-disulfonic acid, $Na_4$ salt
(5) Co, Cu or V chelate of 4,5-dihydroxy-3,6-bis(0-sulfophenyl)-2,7-naphthalene disulfonic acid, $Na_4$ salt 3. Metal chelate compounds of dioxime derivatives
(1) Ni chelate of dimethylglyoxime,
(2) Ni, Cu or Re chelate of 2-furildioxime 4. Metal chelate compounds of phthalein derivatives
(1) Mg or Ba chelate of 3,3'-bis[N,N-di(carboxymethyl)-aminomethyl]-0-cresolphthalein 5. Metal chelate compounds of sulfophthalein derivatives
(1) Cd, Mn, Ag, Al, Sb or Ti chelate of 5,5'-dibromopyrogallol sulfophthalein
(2) In, Fe or Zr chelate of 3,3'-bis[N,N-di(carboxymethyl)-aminomethyl]-p-xylenolsulfonphthalein, $Na_4$ salt
(3) Co, Ni, Cu or Ce chelate of pyrogallol sulfonphthalein.
(4) Mn, Al, Hf or Sn chelate of pyrocatechol sulfonphthalein.

6. Metal chelate compounds of fluorescein derivatives
   (1) Ca, Cu or Mg chelate of 3,3'-bis[N,N-di(carboxymethyl)-aminomethyl]fluorescein.
   (2) Cu, Ni, Mn or Ti chelate of Fluorescein-di(methylene-N-methylglycine), $Na_2$ salt
7. Metal chelate compounds of azonaphthol derivatives
   (1) Mg, Mn, Pb or Zn chelate of 1-(1-hydroxy-2-naphthylazo)-6-nitro-2-naphthol-4-sulfonic acid, Na salt
   (2) Ca chelate of 1-(2-hydroxy-4-sulfo-1-naphthylazo)-2-naphthol-3,6-disulfonic acid, $Na_3$ salt
   (3) Mo, Co, Fe or Sb chelate of 1-(2-pyridylazo)-2-naphthol
   (4) Co or Zn chelate of 1-(2-thiazolylazo)-2-naphthol
   (5) Hf, Th or Zr chelate of 2-(2-hydroxy-3,6-disulfo-1-naphthylazo)benzenearsonic acid, $Na_2$ salt
   (6) Mg chelate of 1-azo-2-hydroxy-3-(2,4-dimethylcarboxanilido)naphthalene-1'-(2-hydroxybenzen-5-sulfonic acid), Na salt
8. Metal chelate compounds of porphyrin derivatives
   (1) Cd(II), Cu(II) or Pb(II) chelate of tetraphenylporphine trisulfonate.
   (2) Cu or Fe chelate of chlorophyll Na salt
9. Metal chelate compounds of metalocene
   (1) Ferrocene,
   (2) Cobaltocene As other organo-metal chelate compounds, there may be mentioned, for example, oxidation-reduction indicators such as iron complex salt of $\alpha,\alpha'$-dipyridyl, iron complex salt of o-phenanthroline, iron complex salt of dimethylglyoxime, iron complex salt of nitro-o-phenanthroline and the like, bisacetylacetonatocobalt-(II), trisacetylacetonatocobalt(III), trisacetylacetonatoiron(III), bisacetylacetonatomanganese(II), trisacetylacetonatomanganese(III), bisacetylacetonatonickel(II), bisacetylacetonatozinc, tetraacetylacetonatozirconium(IV), bisacetylacetonatocopper(II), bisacetylacetonatomagnesium, trisacetylacetonatoaluminum, bisacetylacetonatomolybdenum oxide, bisacetylacetonatotitanium oxide, ethylenediaminetetraacetate iron(III), ethylenediaminetetraacetate cobalt(II), ethylenediaminetetraacetate copper(II), 4-cyclohexyl butyric acid cobalt(II), 4-cyclohexyl butyric acid iron(III), hexaminecobalt sulfate and tetraminezinc sulfate.

Useful metal salts of organic acids may include, for example, zinc salicylate, cobalt salicylate, ferric salicylate, cobalt tartrate, ferric citrate, and zinc benzoate.

Useful carbon functional silane compounds may include, for example, vinyl tris ($\beta$-methoxyethoxy) silane, n-(dimethoxymethylsilylpropyl) ethylenediamine, and n-(trimethoxysilylpropyl) ethylenediamine.

Useful premetallized dyes may be those which form inner complex salts together with metal ions such as copper, cobalt, chromium and the like. Typical examples of the premetallized dyes are:
   (1) Cibalan Yellow GRY
       (C.I. Acid Yellow 116)
   (2) Sumilan Orange G extra conc
       (C.I. Acid Orange 74)
   (3) Neolan Red GRE
       (C.I. Acid Red 183)
   (4) Aizen Opal Pink BH
       (C.I. Acid Red 186)
   (5) Aizen Opal Blue 2GLH
       (C.I. Acid Blue 158)
   (6) Cibalan Green GL
       (C.I. Acid Green 43)
   (7) Aizen Opal Black WGH
       (C.I. Acid Black 52)
   (8) Kayakalan Black RBL
       (C.I. Acid Black 63)
   (9) Aizen Opal Blue new conc
       (C.I. Acid Blue 192)
   (10) Phthalocyanine Blue G conc
       (C.I. Direct Blue 86)
   (11) Sumilight Supra Yellow 2GL
       (C.I. Direct Yellow 39)
   (12) Kayarus Supra Red Violet RL
       (C.I. Direct Violet 47)
   (13) Sumilight Supra Violet BL extra conc
       (C.I. Direct Violet 48)
   (14) Kayarus Supra Blue FGL conc
       (C.I. Direct Blue 90)
   (15) Aizen Primula Brown BRLH
       (C.I. Direct Brown 95)
   (16) Aizen Primula Brown 8RLH
       (C.I. Direct Brown 112)
   (17) Mikacion Rubine BS
       (C.I. Reactive Red 6)
   (18) Procion Rubine H-BN
       (C.I. Reactive Red 32)
   (19) Cibacron Violet F2R-4
       (C.I. Reactive Violet 2)
   (20) Mikacion Navy Blue 3RS
       (C.I. Reactive Blue 9)
   (21) Procion Black H-G
       (C.I. Reactive Black 1)
   (22) Mikacion Grey GS
       (C.I. Reactive Black 9)
   (23) Aizen Opal Black new conc
       (C.I. Acid Black 119)
   (24) Aizen Opal Black WH extra conc
       (C.I. Acid Black 52)
   (25) Aizen Opal Black GMH special The coating-film forming compound may be dissolved or dispersed in a liquid medium such as water, various organic solvents as exemplified below or mixed liquids thereof in forming the liquid composition of the present invention.

Preferred organic solvents are those which are water-soluble. Typical examples thereof are: alkyl alcohols having 1-4 carbon atoms such as methyl alcohol, ethyl alcohol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketones or ketoalcohols such as acetone, diacetone alcohol and the like; ethers such as tetrahydrofuran, dioxane and the like; polyalkylene glycols such as polyethylene glycol, polypropylene glycol and the like; alkylene glycols wherein the alkylene has 2-6 carbon atoms such as ethylene glycol, propylene glycol, butylene glycol, triethylene glycol, 1,2,6-hexane triol, thiodiglycol, hexylene glycol, diethylene glycol and the like; glycerin; lower alkyl ethers of polyhydric alcohols such as ethylene glycol methyl ether, diethylene glycol methyl (or ethyl) ether, triethylene glycol monomethyl (or ethyl) ether and the like.

Among those water-soluble organic solvents, polyhydric alcohols such as diethylene glycol and the like, and lower alkyl ethers of polyhydric alcohols such as triethylene glycol monomethyl (or ethyl) ether and the like are more preferable.

The content of the coating-film forming compound in the liquid composition of the present invention is appropriately determined based on the particular liquid medium and coating-film forming compound, conditions for their use, relationship with other additives, and relationship with desired physical properties of the liquid, and so forth. From the standpoint of forming favorable coating films the upper limit of its content with respect to the total quantity of the liquid composition is usually less than 3% by weight, more preferably less than 2% by weight, and optimumly less than 1% by weight, and the lower limit thereof is usually 0.001% by weight and above, and more preferably 0.01% by weight and above.

When the above-mentioned organic solvents are mixed with water as the liquid medium for use, the ratio by weight of the organic solvent to the water medium should desirably be from 0.1 to 10, preferably 0.2 to 5, optimumly and 0.4 to 2.

It should be noted that, although the liquid composition of the present invention essentially consists of the above-mentioned constituent elements, a wide variety of applications are possible by the addition of various other components. For example, by the addition of a recording agent to be mentioned hereinbelow and, depending on necessity, various other additives, there can be obtained an excellent recording liquid which can be effectively applied to the recording method as disclosed in the above-referred-to DOLS No. 2843064.

The recording agent to be used in the recording liquid of the above-mentioned composition may be selected from, for example, water-soluble dyes such as direct dyes, acidic dyes, basic dyes, and reactive dyes, provided that they are not decomposed by oxidation due to the heat energy used at the time of forming the coating film.

While the content of the abovementioned water-soluble dyes is determined by the kind of the coating-film forming compound and the liquid medium, characteristics required of the recording liquid, and so on, it generally ranges ffrom 0.5 to 20% by weight with respect to the total weight of the recording liquid, or preferably from 0.5 to 15% by weight, or more preferably from 1 to 10% by weight.

Preferable water-soluble dyes are exemplified below. The color index numbers thereof are shown in the parentheses.
(1) Nippon Pure Yellow 5G (13920)
(2) Direct Fast Yellow GC (29000)
(3) Diacid Light Yellow 2GP (18900)
(4) Sumilight Orange G conc (29050)
(5) Suminol Fast Red GG conc (14690)
(6) Sumilight Red F3B (35780)
(7) Sumilight Red 4B (28160)
(8) Solar Fast Red 3G (18050)
(9) Suminol Milling Scarlet G (23905)
(10) Suminol Milling Brilliant Red B conc (18134)
(11) Japanol Violet J (22570)
(12) Sumilight Violet BB conc (27905)
(13) Suminol Fast Bordeaux B conc (17060)
(14) Sumilight Supra Blue FBGL (23155)
(15) Suminol Levelling Blue 4GL (61125)
(16) Suminol Fast Sky Blue B (62105)
(17) Direct Dark Green B (30280)
(18) Sumilan Green BL (13425)
(19) Suminol Milling Green SS (20440)
(20) Nippon Fast Brown CB (22345)
(21) Acid Blue Black 10B (20470)
(22) Suminol Milling Black 8BX (26370)
(23) Sumiacryl Yellow 3G (48055)
(24) Rhodamine 6GCP (45160)
(25) Sumiacryl Orange G (48035)
(26) Methylene Blue (52015)
(27) Direct Fast Yellow R (29025)
(28) Diacid Fast Yellow R 140% (18835)
(29) Diacotton Fast Orange WS (29156)
(30) Direct Fast Scarlet 4BS (29160)
(31) Dialuminous Red 4BL (29065)
(32) Diacid Supra Red 3B (18065)
(33) Diacid Arizarine Rubinol F3G 200% (68205)
(34) Diacid Fast Red 6B (18055)
(35) Diacid Light Violet RS 130% (60730)
(36) Dialuminous Blue B2R conc (34140)
(37) Diacid Light Blue 2A 180% (62055)
(38) Diacid Light Green GS 160% (61570)
(39) Dialuminous Brown G conc (36200)
(40) Diacid Supra Brown R (17605)
(41) Arizarine Light Brown BL 190% (66710)
(42) Direct Fast Black AB (35440)
(43) Dialuminous Grey G (34180)
(44) Dialuminous Grey R conc (35870)
(45) Diacid Fast Black BR conc (17580)
(46) Diacid Fast Grey 2BLW 120% (65005)
(47) Chrysophenine (24895)
(48) Kayacyl Yellow GG (18965)
(49) Kayanol Milling Yellow 0 (25135)
(50) Kayaku Acid Orange II (15510)
(51) Kayanol Milling Orange G (22895)
(52) Kayaku Direct Scarlet 3B (23630)
(53) Kayacyl Rubinol 3GS (17045)
(54) Kayanol Milling Red RS (23635)
(55) Kayaku Acid Red 3B (24810)
(56) Kayaku Acid Brilliant Red BL (18129)
(57) Kayarus Supra Red Violet RL (25410)
(58) Kayarus Supra Violet 5BL conc (29125)
(59) Kayarus Blue G conc (34200)
(60) Kayarus Supra Blue FF2GL (51300)
(61) Kayacyl Blue BR (62130)
(62) Kayanol Milling Cyanime 5R (26360)
(63) Kayanol Milling Green GW (61580)
(64) Kayanol Cyanine Green 5G (62560)
(65) Direct Brown M (22311)
(66) Kayanol Milling Brown 4GW (10410)
(67) Direct Fast Black D (27700)
(68) Direct Deep Black EX (30235)
(69) Kayaku Leather Black B (30336)
(70) Kayarus Supra Grey VGN (25040)
(71) Kayanol Milling Black VLG (27070)
(72) Kayacryl Brilliant Pink B (B.R27)
(73) Direct Fast Yellow 5GL (25300)
(74) Aizen Tortrazine conc (19140)
(75) Direct Fast Orange S (29150)
(76) Aizen Direct Fast Red FH (22310)
(77) Aizen Direct Bordeaux GH (22155)
(78) Aizen Primula Pink 2BLH (25380)
(79) Aizen Brilliant Scarlet 3RH (16255)
(80) Aizen Opal Blue 2GLH (14880)
(81) Direct Green B (30295)
(82) Aizen Primula Brown 8RLH (29166)
(83) Direct Fast Black B (35435)
(84) Direct Fast Black conc (27720)
(85) Aizen Opal Black WGH (15711)
(86) Aizen Cathilon Pink FGH (48015)
(87) Aizen Methyl Violet BB (42535)
(88) Aizen Malachite Green (42000)
(89) Aizen Cathilon Grey BLH (11825)

(90) Water Pink 2 (45410)
(91) Water Red 2 (45380)
(92) Water Yellow 1 (19140)
(93) Water Blue 105 (42660)
(94) Water Blue 9 (42090)
(95) Water Blue 106 (42045)
(96) Water Blue 3 (74180)
(97) Water Black 187L (D.B154)
(98) Water Black R-455 (50420)
(99) Water Black L-200 (35255)

Dyes (1)–(26) are products of Sumitomo Chemical Co., Ltd., dyes (27)–(46) are products of Mitsubishi Chemical Industries, Ltd., dyes (47)–(72) are products of Nippon Kayaku K.K., dyes (73)–(89) are products of Hodogaya Chemical Co., Ltd., and dyes (90)–(99) are products of Orient Chemical Co., Ltd.

Other preferable dyes may include, for example, disperse dyes such as C.I. Disperse Yellow 31, C.I. Disperse Orange 11, C.I. Disperse Red 4, C.I. Disperse Blue 7 and the like; oil soluble dyes such as C.I. Solvent Yellow 15, C.I. Solvent Orange 37, C.I. Solvent Red 8, C.I. Solvent Blue 73, C.I. Solvent Black 23 and the like; and reactive dyes such as C.I. Reactive Yellow 3, C.I. Reactive Orange 15, C.I. Reactive Red 6, C.I. Reactive Violet 2, C.I. Reactive Blue 15, C.I. Reactive Blue 19, C.I. Reactive Black 8, C.I, Reactive Black 1 and the like.

Besides the above-mentioned components, there may further be used various other additives to improve the values of the physical properties of the recording liquid. Examples of these additives are: pH value adjuster, anti-drying agent, viscosity adjuster, surface tension adjuster, anti-mold agent, stabilizer, etc.

Figure 1B:
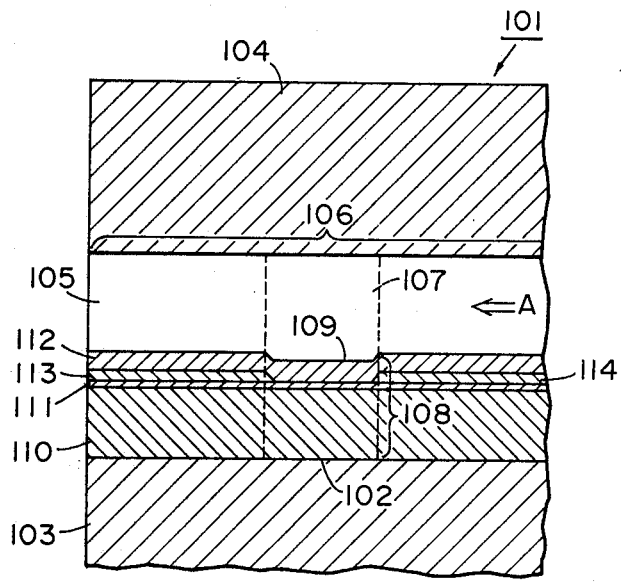
FIG. 1B is a partial longitudinal cross-section of the liquid jet recording head shown in FIG. 1A taken along the dot-and-dash line XY.

The following detailed explanations is given for a case of performing the recording operation using the recording head shown in FIGS. 1A and 1B and the recording liquid composition of the present invention.

When the recording liquid is introduced into the heat acting zone 107 in a direction shown by arrow A in FIG. 1B, and the electro-thermal transducer 102 is driven under a predetermined condition, heat energy is instantaneously developed at the heat generating zone, whereby the liquid (recording liquid) in the heat acting zone 107 is instantaneously heated through the heat acting surface 109. The heated liquid undergoes an abrupt state change, and evaporates to instantaneously form bubbles in the heat acting zone 107. The bubbles rapidly contract in volume and disappear as soon as electric conduction to the electro-thermal transducer 102 is stopped. During the repeated development and disappearance of the bubbles, if the coating-film forming compound contacts the heat acting surface 109, or is in close proximity thereto, the coating-film forming compound receives the heat energy to bring about formation of the coating film through oxidation, thereby covering the heat acting surface 109 with the coating film thus formed. The coating film thus formed on the heat acting surface 109 absorbs therein the shock waves which have been created by the high speed contraction of the bubbles formed at the heat acting zone 107, and protects the heat generating resistive layer 111 and the upper layer 112, if such is provided. Such coating film formed on the heat acting surface 109 may in some cases be subjected to damage and exfoliation either partially or substantially totally while it is under the shock waves for repeated number of times. However, at the instant of its exfoliation, fresh coating film is immediately formed at that portion, so that, throughout the recording operation, the coating film can be secured on the heat acting surface 109. As a result, the service life of the electro-thermal transducer 102 can be remarkably prolonged or extended in comparison with the conventional one, whereby the frequency of the droplet formation per unit time can be increased, and the recording operation can be done continuously over a long period of time.

In addition, when the coating film is isolated from the heat acting surface 109, it is again dissolved or dispersed in the liquid, so that there is no possibility of its clogging the liquid flow path at the liquid discharging section 106.

Thus, when the liquid composition according to the present invention is prepared and used as the recording liquid, the service life of the conventional recording head can be extended quite remarkably. Particularly, in the case of using the recording head of the full line type, high density multi-orifice construction as disclosed in the above-referred-to DOLS No. 2843064, if the head is of the full line type in the direction of the short side of the A-4 size paper, there should be provided approximately 1,700 pieces of electro-thermal transducers with the result that, even when the service life of each electro-thermal transducer is, for example, $10^8$ of the applied pulse numbers, the probability of damage caused to the electro-thermal transducers in the entire recording head becomes remarkably high, which not only constitutes a large factor in the deterioration of its commercial value, but also invites remarkable decrease in its reliability. However, when the recording liquid of the present invention is used with such a recording head, not only is the service life of each electro-thermal transducer remarkably extended, but also the probability of damage is considerably decreased, thereby giving high operational reliability of the device.

While the liquid composition of the present invention can be used as the recording liquid per se by being mixed with the recording agent and other additives as already mentioned above, it can also be separately introduced into the liquid flow path of the recording head only at the time it is necessary to form the desired coating film at a predetermined location.

The foregoing explanation has been provided in relation to the recording method disclosed in the above-mentioned DOLS No. 2843064 to avoid any complexity. It should, however, be noted that the liquid composition according to the present invention is not only applicable to the recording method of the DOLS No. 2843064, but also can be sufficiently employed in a technical field having a similar problem, where the formation of the coating film is required for some purpose or other.

In order to enable those persons skilled in the art to put this invention into practice, the following several preferred examples are presented.

EXAMPLE 1

An $SiO_2$ layer (lower layer) is formed on an alumina base plate to a thickness of 5 $\mu$m by sputtering. Subsequently, a heat generating resistive pattern of 50 $\mu$m $\times$ 200 $\mu$m is formed by laminating a layer of $HfB_2$ as the heat generating resistive member to a thickness of 1,000 Å and then a layer of aluminum as an electrode to a thickness of 3,000 Å, thereafter selectively etching the aluminum layer. After this, an $SiO_2$ as a protective layer (upper layer) is laminated on this layered structure to a thickness of 3,500 Å by sputtering, thereby forming an electro-thermal transducer on the base plate. Onto this laminated structure, there is joined a glass plate with a groove of 50 μm wide and 50 μm deep incised therein in such a manner that the groove may be registered with the heat generating resistive member. Subsequently, the end face of the orifice is ground to provide a distance between the tip end of the heat generating resistive member and the orifice of 250 μm, thereby producing the recording head. Using this recording head, liquid ink of the following composition is discharged through the orifice.

| | |
|---|---|
| Black dye (WATER BLACK 187L) | 5 wt. parts |
| Ethylenediaminetetraacetate cobalt (II) | 0.1 wt. parts |
| Ethyl alcohol | 44.8 wt. parts |
| Water | 50 wt. parts |

When the recording head is driven for a cycle of 200 μsec. with a rectangular voltage pulse print signal of 10 μsec. and 40 V, it exhibits a life which is sufficiently durable for a continuous printing of 210 hours.

For the sake of comparison, the same recording head is driven under the same driving conditions as above with ink of the same composition as above, except for excluding ethylenediaminetetraacetate cobalt (II) from the above-mentioned ink composition. The recording head exhibits a life of ten hours of continuous printing.

EXAMPLE 2

In place of ethylenediaminetetraacetate cobalt (II) used in the ink composition of Example 1 above, the under-mentioned various compounds are used, and the durability of the recording head is tested. The results are shown in the following Table 1. The recording head is driven with a cycle of 200 μs with a rectangular voltage pulse print signal of 10 μs and 50 V.

TABLE 1

| COMPOUND | CONTENT | DURABLE FOR |
|---|---|---|
| Bis-acetylacetonato cobalt (II) | 0.3 wt % | 60 hrs. |
| Tris acetylacetonato iron (III) | 0.05 wt % | 67 hrs. |
| Ethylenediaminetetraacetate iron (III) | 0.07 wt % | 60 hrs. |
| Bis-acetylacetonato copper (II) | 0.1 wt % | 40 hrs. |
| 4-cyclohexyl lactic acid cobalt (II) | 0.02 wt % | 50 hrs. |
| Bis-acetylacetonato manganese (II) | 0.2 wt % | 65 hrs. |
| Zinco salicylate | 0.5 wt % | 45 hrs. |
| Vinyl tris (β-methoxy-ethoxy) silane | 0.1 wt % | 70 hrs. |
| Iron complex salt of α,α'-dipyridyl | 0.08 wt % | 55 hrs. |
| Blank | — | 6 hrs. |

EXAMPLE 3

Table 2 below shows the addition of various amounts of the ethylenediaminetetraacetate cobalt (II) used in the ink composition in Example 1 and measurements of the durability of the recording head. The driving conditions of the recording head are the same as in Example 1 above.

TABLE 2

| Amount of Ethylenediamine Tetra-Acetate Cobalt (II) | Recording Head Endured For |
|---|---|
| 2.0 wt % | 40 hrs. |
| 1.0 wt % | 60 hrs. |
| 0.5 wt % | 150 hrs. |
| 0.1 wt % | 210 hrs. |
| 0.05 wt % | 230 hrs. |
| 0.01 wt % | 170 hrs. |

TABLE 2-continued

| Amount of Ethylenediamine Tetra-Acetate Cobalt (II) | Recording Head Endured For |
|---|---|
| 0.001 wt % | 20 hrs. |
| 0 wt % | 10 hrs. |

EXAMPLE 4

The same results as in Example 1 above are also obtained in the case of using "AIZEN SPIRON BLACK GMH SPECIAL" in place of "WATER BLACK 187L" used as the black dye in the liquid ink composition of Example 1.

EXAMPLE 5

The same results as in Example 1 above are also obtained in the case of using ethylene glycol in place of ethyl alcohol in the ink composition used in Example 1.

EXAMPLE 6

The same results as in Example 1 above are also obtained in the case of using methyl carbitol in place of water in the ink composition used in Example 4 above.

EXAMPLE 7

An $SiO_2$ layer (lower layer) is formed on an alumina base plate to a thickness of 5 μm by sputtering. Subsequently, a heat generating resistive pattern of 50 μm × 200 μm is formed by laminating a layer of $HfB_2$ as the heat generating resistive member to a thickness of 1,000 Å and then a layer of aluminum as an electrode to a thickness of 3,000 Å, thereafter selectively etching the aluminum layer. After this, $SiO_2$ as a protective layer (upper layer) is laminated on this layered structure to a thickness of 3,500 Å by sputtering, thereby forming an electro-thermal transducer on the base plate. Onto this laminated structure, there is joined a glass plate with a groove of 50 μm wide and 50 μm deep incised therein in such a manner that the groove may be registered with the heat generating resistive member. Subsequently, the end face of the orifice is ground to provide a distance between the tip end of the heat generating resistive member and the orifice of 250 μm, thereby producing the recording head. Using this recording head, liquid ink of the following composition is discharged through the orifice.

| | |
|---|---|
| Black dye (WATER BLACK 187L) | 4 wt. parts |
| Aizen Opal Black WGH | 0.5 wt. parts |
| Diethylene Glycol | 30 wt. parts |
| Water | 65.5 wt. parts |

When the recording head is driven for a cycle of 200 μsec. with a rectangular voltage pulse print signal of 10 μsec. and 40 V, it exhibits a life which is sufficiently durable for a continuous printing of 220 hours.

For the sake of comparison, the same recording head is driven under the same driving conditions as above with ink of the same composition as above, except for excluding Aizen Opal Black WGH from the above-mentioned ink composition. The recording head exhibits a life of ten hours of continuous printing.

EXAMPLE 8

In place of Aizen Opal Black WGH used in the ink composition of Example 7 above, the various compounds set forth in Table 3 below are used, and the life of the recording head is tested. The results are shown in the following Table 3. The recording head is driven with a cycle of 200 μs with a rectangular voltage pulse print signal of 10 μs and 45 V.

TABLE 3

| COMPOUND | CONTENT | DURABLE FOR |
| --- | --- | --- |
| Phthalocyanine Blue-SBL | 0.1 wt % | 65 hrs. |
| Sumilight Supra Yellow-2GL | 0.2 wt % | 70 hrs. |
| Neolan Red GRE | 0.3 wt % | 60 hrs. |
| Cibalan Green GL | 0.1 wt % | 63 hrs. |
| Kayakalan Black RBL | 0.07 wt % | 72 hrs. |
| Kayarus Supra Red Violet | 0.05 wt % | 68 hrs. |
| Aizen Primula Brown BRLH | 0.05 wt % | 58 hrs. |
| Aizen Primula Brown BRLH | 0.03 wt % | 54 hrs. |
| Mikacoin Rubine BS | 0.15 wt % | 62 hrs. |
| Procion Black HG | 0.25 wt % | 75 hrs. |
| Blank | — | 7 hrs. |

EXAMPLE 9

Table 4 below shows the addition of various amounts of Aizen Opal Black WGH used in the ink composition in Example 7 and measurements of the durability of the recording head. The driving conditions of the recording head are the same as in Example 1 above.

TABLE 4

| Amount of Aizen Opal Black WGH | Recording Head Endured for |
| --- | --- |
| 2.0 wt % | 200 hrs. |
| 1.0 wt % | 200 hrs. |
| 0.5 wt % | 220 hrs. |
| 0.1 wt % | 250 hrs. |
| 0.05 wt % | 160 hrs. |
| 0.01 wt % | 50 hrs. |
| 0.001 wt % | 20 hrs. |
| 0 wt % | 10 hrs. |

EXAMPLE 10

The same results as in Example 7 above are also obtained in the case of using "Aizen Malachite Green" in place of "WATER BLACK 187L" which is used as the black dye in the liquid ink composition of Example 7.

EXAMPLE 11

The same results as in Example 7 above are also obtained in the case of using triethylene glycol monomethyl ether in place of diethylene glycol in the ink composition used in Example 7.

EXAMPLE 12

The same results as in Example 7 above are also obtained in the case of using ethyl cellosolve in place of water in the ink composition used in Example 10 above.

EXAMPLE 13

An $SiO_2$ layer (lower layer) is formed on an alumina base plate to a thickness of 5 μm by sputtering. Subsequently, a heat generating resistive pattern of 50 μm×200 μm is formed by laminating a layer of $HfB_2$ as the heat generating resistive member to a thickness of 1,000 Å and then a layer of aluminum as an electrode to a thickness of 3,000 Å, thereafter selectively etching the aluminum layer. After this, $SiO_2$ as a protective layer (upper layer) is laminated on this layered structure to a thickness of 3,500 Å by sputtering, thereby forming an electro-thermal transducer on the base plate. Onto this laminated structure, there is joined a glass plate with a groove of 50 μm wide and 50 μm deep incised therein in such a manner that the groove may be registered with the heat generating resistive member. Subsequently, the end face of the orifice is ground to provide a distance between the tip end of the heat generating resistive member and the orifice of 250 μm, thereby producing the recording head. Using this recording head, liquid ink of the following composition is discharged through the orifice.

| Black dye (WATER BLACK 187L) | 4 wt. parts |
| --- | --- |
| Co (II) chelate of 2-(2-pyridylazo) chromotropic acid Na₂ salt (compound A) | 0.05 wt. parts |
| Etylene glycol | 40 wt. parts |
| N—methyl-2-pyrrolidone | 10 wt. parts |
| Water | 46 wt. parts |

When the recording head is driven for a cycle of 200 μsec. with a rectangular voltage pulse print signal of 10 μsec. and 40 V, it exhibits a life which is sufficiently durable for a continuous printing of 230 hours.

For the sake of comparison, the same recording head is driven under the same driving conditions as above with ink of the same composition as above, except for excluding Co (II) chelate of 2-(2-pyridylazo) chromotropic acid Na₂ salt from the above-mentioned ink composition. The recording head exhibits a life of ten hours of continuous printing.

EXAMPLE 14

In place of Co (II) chelate of 2-(2-pyridylazo) chromotropic acid Na₂ salt used in the ink composition of Example 13 above, the various compounds set forth in Table 5 below are used, and the life of the recording head is tested. The results are shown in the Table 5. The recording head is driven with a cycle of 200 μsec. with a rectangular voltage pulse print signal of 10 μs and 47 V.

TABLE 5

| COMPOUND | CONTENT | DURABLE FOR |
| --- | --- | --- |
| Zr chelate of 2,7-Bis(4-chloro-2-phosphonophenylazo)chromotropic Acid, Na₂ salt | 0.05 wt % | 68 hrs. |
| Ni chelate of Dimethylglyoxime | 0.07 wt % | 70 hrs. |
| Mn chelate of 5,5'-Dibromopyrogalol sulfophthaleine | 0.01 wt % | 46 hrs. |
| Mg chelate of 3,3'-Bis[NN—di(carboxymethyl)-aminomethyl]-O—cresolphthalein | 0.08 wt % | 57 hrs. |
| Cu chelate of 3,3'-Bis[N,N—di(carboxymethyl)-aminomethyl]-fluorescein | 0.20 wt % | 50 hrs. |
| Pb chelate of 1-(1-Hydroxy-2-naphthylazo)-6-nitro-2-naphthol-4-sulfonic Acid, Na salt | 0.05 wt % | 65 hrs. |
| Cu chelate of Tetraphenylporphine trisulfonate | 0.02 wt % | 55 hrs. |
| Fe chelate of Chlorophyll, Na salt | 0.03 wt % | 65 hrs. |
| Blank | — | 6 hrs. |

EXAMPLE 15

Table 6 below shows the amount of the compound A[Co (II) chelate of 2-(2-pyridylazo) chromotropic acid Na₂ salt] used in the ink composition used in Example 1 and measurements of the durability of the recording head. The driving conditions of the recording head are the same as in Example 1 above.

TABLE 6

| Amount of Compound A | Recording Head Endured for |
|---|---|
| 2.0 wt % | 100 hrs. |
| 1.0 wt % | 160 hrs. |
| 0.5 wt % | 210 hrs. |
| 0.1 wt % | 250 hrs. |
| 0.05 wt % | 230 hrs. |
| 0.01 wt % | 180 hrs. |
| 0.001 wt % | 40 hrs. |
| 0 wt % | 10 hrs. |

EXAMPLE 16

The same results as in Example 13 above are also obtained in the case of using "Aizen Methyl Violet BB" in place of "WATER BLACK 187L" which is used as the black dye in the liquid ink composition of Example 13.

EXAMPLE 17

The same results as in Example 13 above are also obtained in the case of using diethylene glycol monoethyl ether in place of ethylene glycol in the ink composition of Example 13.

EXAMPLE 18

The same results as in Example 16 above are also obtained in the case of using ethyl alcohol in place of water in the ink composition of Example 16 above.

What we claim is:

1. In a recording method wherein liquid droplets containing a recording agent are caused to adhere onto the surface of a recording medium by using a recording head provided with a discharge orifice to eject the liquid therefrom and to form flying droplets, a heat energy acting zone filled with a body of said liquid which is communicatively connected with the discharge orifice and a liquid feeding port and where heat energy to form the flying droplets is imparted repeatedly to the body of liquid filled in said zone, and a heat energy generating element to generate the heat energy, the improvement comprising the steps of:
   (a) filling said heat energy acting zone with a liquid containing a liquid medium, a recording agent to form an image on a recording medium, and a coating-film forming compound which undergoes a thermal oxidation reaction when subjected to the action of said heat energy and which, in response to said action, is capable of and is used in an amount sufficient to thereby form a coating film; and
   (b) causing said heat energy to repeatedly act on said liquid to subject the coating-film forming compound to the thermal oxidation reaction so as to repeatedly form the coating film on the wall surface of said heat energy acting zone.

2. The recording method as set forth in claim 1, wherein said coating-film forming compound is selected from the group consisting of organo-metallic chelate compounds, metal salts of organic acids, and metallized dyes.

3. The recording method as set forth in claim 1, wherein said organo-metallic chelate compound is selected from the group consisting of monoazochromotropic acid derivatives, bisazochromotropic acid derivatives, dioxime derivatives, phthaleine derivatives, sulfophthaleine derivatives, fluoresceine derivatives, azonaphthol derivatives, porphyrin derivatives, and metallocene.

4. The recording method as set forth in claim 1, wherein the content of said recording agent ranges from 0.5 to 20% by weight with respect to the total quantity of said liquid composition.

* * * * *